(12) United States Patent
Ishikawa et al.

(10) Patent No.: US 8,931,698 B2
(45) Date of Patent: Jan. 13, 2015

(54) CARD READER

(75) Inventors: Kazutoshi Ishikawa, Nagano (JP); Naohito Nakayama, Nagano (JP)

(73) Assignee: Nidec Sankyo Corporation, Nagano (JP)

( * ) Notice: Subject to any disclaimer, the term of this patent is extended or adjusted under 35 U.S.C. 154(b) by 241 days.

(21) Appl. No.: 13/577,628

(22) PCT Filed: Feb. 4, 2011

(86) PCT No.: PCT/JP2011/052337
§ 371 (c)(1),
(2), (4) Date: Dec. 12, 2012

(87) PCT Pub. No.: WO2011/096507
PCT Pub. Date: Aug. 11, 2011

(65) Prior Publication Data
US 2013/0119136 A1 May 16, 2013

(30) Foreign Application Priority Data

Feb. 8, 2010 (JP) .................................. 2010-024971
Feb. 8, 2010 (JP) .................................. 2010-024972

(51) Int. Cl.
*G06K 7/08* (2006.01)
*G06K 7/01* (2006.01)
(Continued)

(52) U.S. Cl.
CPC .............. *G06K 7/01* (2013.01); *G07F 19/2055* (2013.01); *G06K 7/087* (2013.01); *B65H 29/125* (2013.01); *G07F 7/0873* (2013.01); *B65H 2404/725* (2013.01); *B65H 2407/11* (2013.01);
(Continued)

(58) Field of Classification Search
USPC .................................. 235/449, 451, 435, 439
See application file for complete search history.

(56) References Cited

U.S. PATENT DOCUMENTS 7,347,377 B2 * 3/2008 Kitazawa ...................... 235/475
7,500,609 B2 * 3/2009 Hirasawa et al. ............. 235/449
(Continued)

FOREIGN PATENT DOCUMENTS

JP          2-38650        3/1990
JP       2000-099636      7/2000
(Continued)

OTHER PUBLICATIONS

International Search Report for Application No. PCT/JP2011/052337 mailed Apr. 26, 2011.

*Primary Examiner* — Ahshik Kim
(74) *Attorney, Agent, or Firm* — Frommer Lawrence & Haug LLP

(57) ABSTRACT

A card reader that can prevent phishing and causes no damage on a card in the case where no phishing comes up. A card reader equipped with a card transfer mechanism for taking in and ejecting a card includes a gate mechanism, in which formed is an insertion & ejection slot for inserting and ejecting the card. A protrusion protruding toward an ejecting direction of the card is formed in the gate mechanism. Furthermore, the gate mechanism includes: a card detection mechanism for detecting the card having been ejected by the card transfer mechanism to a pullout-enabled position where a user of the card reader can pull out the card; and a card pullout prevention mechanism for protecting the card from being pulled out when the card is not ejected to the pullout-enabled position at the time of ejecting the card. The card detection mechanism is placed inside the protrusion.

15 Claims, 8 Drawing Sheets

(51) Int. Cl.
  *G07F 19/00* (2006.01)
  *B65H 29/12* (2006.01)
  *G07F 7/08* (2006.01)

(52) U.S. Cl.
  CPC ......... *B65H2407/20* (2013.01); *B65H 2408/13* (2013.01); *B65H 2701/1914* (2013.01)
  USPC ............................ 235/449; 235/435; 235/439

(56) References Cited

U.S. PATENT DOCUMENTS 8,496,182 B2 * 7/2013 Mizawa ........................ 235/483
2004/0026507 A1 * 2/2004 Nagata et al. .................. 235/449
2004/0035929 A1 * 2/2004 Okada ........................... 235/438

FOREIGN PATENT DOCUMENTS

| JP | 2001-067514 | 3/2001 |
| JP | 2004-070476 | 3/2004 |
| JP | 2004-280308 | 10/2004 |
| JP | 2005-309861 | 11/2005 |
| JP | 2006-155567 | 6/2006 |
| JP | 2007-272321 | 10/2007 |
| JP | 2008-191916 | 8/2008 |
| JP | 2008-276484 | 11/2008 |

\* cited by examiner

CARD READER

The present application claims priority from PCT Patent Application No. PCT/JP2011/052337 filed on Feb. 4, 2011, which claims priority from Japanese Patent Application Nos. JP 2010-024972 and JP 2010-024971, both filed on Feb. 8, 2010, the disclosures of which are incorporated herein by reference in their entirety.

FIELD OF THE INVENTION

The present invention relates to a card reader equipped with a card transfer mechanism for taking in and ejecting a card.

The present invention also relates to a card reader for reading magnetic data recorded in a card and/or recording magnetic data into a card.

DESCRIPTION OF RELATED ART

It is noted that citation or identification of any document in this application is not an admission that such document is available as prior art to the present invention.

Conventionally, used widely is a card reader that takes in a card internally, and carries out predetermined processing, such as reading and recording magnetic data, and the like. In such a type of card reader, for example, an entire part of a card is taken into the card reader by a card transfer mechanism installed internally, for the predetermined processing. On the other hand, in the industry where card readers are used, heretofore there has been emerging a big problem of so-called phishing scams in which a criminal sets some means for hampering a process of ejecting a card from a internal section of a card reader in order to make the card jammed in the card reader and afterwards acquire the jammed card illegally.

Then, being equipped with a configuration for prevention of such a phishing scam, a card reader is proposed (For example, refer to Japanese Unexamined Patent Application Publication No. 2006-155567 ("JP 2006-155567")). The card reader described in JP 2006-155567 is equipped with an anti-pullout locking mechanism that prevents a card from being pulled out when a criminal removes a means for phishing and tries to pull out the card jammed in the card reader. In the card reader, when a checking means such as a sensor detects a card having been stopped abnormally at the time of card ejection, the anti-pullout locking mechanism becomes ready for operation. If the criminal tries to pull out the card under the situation, the anti-pullout locking mechanism gets activated so that a locking tooth bites into the card. If once the locking tooth bites into the card, the card is locked at a predetermined retaining position so that the card is kept away from being pulled out by the criminal, and eventually the card is protected from the phishing scam.

In the meantime, used widely is a card reader that takes in a card internally, and carries out reading and recording magnetic data. On the other hand, in the industry where card readers are used, heretofore there has been emerging a big problem of so-called skimming scams in which a criminal sets a magnetic head at a card inserting section of a card reader in order to illegally acquire magnetic data of the card with the magnetic head.

Then, being equipped with a configuration for prevention of such a skimming scam, a card reader is proposed (For example, refer to Japanese Unexamined Patent Application Publication No. 2001-67514 ("JP 2001-67514")). In the card reader described in JP 2001-67514, a protrusion that protrudes towards a card ejecting direction is formed at a position, which meets a magnetic stripe of an inserted card, in a card inserting section where the card is inserted and ejected. Therefore, in the card reader, it is difficult for a criminal to set a magnetic head for skimming at the position, which meets a magnetic stripe of the inserted card, in the card inserting section. As a result of that, in the card reader, it becomes possible to prevent a skimming scam.

It is noted that in this disclosure and particularly in the claims and/or paragraphs, terms such as "comprises", "comprised", "comprising" and the like can have the meaning attributed to it in U.S. Patent law; e.g., they can mean "includes", "included", "including", and the like; and that terms such as "consisting essentially of" and "consists essentially of" have the meaning ascribed to them in U.S. Patent law, e.g., they allow for elements not explicitly recited, but exclude elements that are found in the prior art or that affect a basic or novel characteristic of the invention.

It is further noted that the invention does not intend to encompass within the scope of the invention any previously disclosed product, process of making the product or method of using the product, which meets the written description and enablement requirements of the USPTO (35 U.S.C. 112, first paragraph) or the EPO (Article 83 of the EPC), such that applicant(s) reserve the right to disclaim, and hereby disclose a disclaimer of, any previously described product, method of making the product, or process of using the product.

SUMMARY OF THE INVENTION

As mentioned above, in the card reader described in JP 2006-155567, it is possible to prevent a phishing scam. Specifically, in order to prevent phishing, when a user cannot pull the card out of the card reader, what is required is to lock the card for protecting the card itself from being pulled out by the criminal.

Incidentally, in the card reader described in JP 2006-155567, when the checking means detects the card having been stopped abnormally at the time of card ejection, the anti-pullout locking mechanism becomes ready for operation. Therefore, even when the user is able to pull out the card, the anti-pullout locking mechanism is likely to become ready for operation. If the user pulls out the card under the situation, the anti-pullout locking mechanism gets activated so that the locking tooth bites into the card. Namely, in the case of the card reader, the user is able to pull the card out of the card reader. Therefore, even when no phishing comes up, it is likely that the card is damaged by way of card operation of the user.

Then, a first subject of the present invention is to provide a card reader that can prevent phishing and causes no damage on a card in the case where no phishing comes up.

Incidentally, as mentioned above, in the card reader described in JP 2001-67514, it is difficult to surely prevent a criminal from setting a magnetic head for skimming at the position, which meets a magnetic stripe of the inserted card, in the card inserting section. As a result, in the case of the card reader, it is difficult to effectively prevent skimming.

Then, a second subject of the present invention is to provide a card reader that can effectively prevent skimming.

To bring a solution for the first subject described above, a card reader of the present invention includes: a card transfer mechanism for taking in and ejecting a card; and a gate mechanism having an insertion & ejection slot formed, for inserting and ejecting the card, and being located at an end of an ejecting direction of the card in the card reader; wherein a protrusion protruding toward the ejecting direction of the card is formed in the gate mechanism; and the gate mechanism includes: a card detection mechanism for detecting the card having been ejected by the card transfer mechanism to a pullout-enabled position where a user of the card reader can pull out the card; and a card pullout prevention mechanism for protecting the card from being pulled out when the card is not ejected to the pullout-enabled position at the time of ejecting the card; and the card detection mechanism is placed inside the protrusion.

In the card reader of the present invention, the gate mechanism includes: a card detection mechanism for detecting the card having been ejected by the card transfer mechanism to a pullout-enabled position where a user of the card reader can pull out the card; and a card pullout prevention mechanism for protecting the card from being pulled out when the card is not ejected to the pullout-enabled position at the time of ejecting the card. Therefore, according to the present invention, it becomes possible to prevent phishing by way of protecting the card with the card pullout prevention mechanism from being pulled out in the case where a means for phishing is installed in the card reader and the card is not ejected to the pullout-enabled position so that the user cannot pull out the card. On the other hand, even if a means for phishing is installed in the card reader, the card pullout prevention mechanism does not interfere with a pullout of the card as far as the card is ejected to the pullout-enabled position so that the use can pull out the card. In other words, even if the means for phishing is installed in the card reader, the card pullout prevention mechanism does not interfere with a pullout of the card under a situation where no phishing occurs. Therefore, according to the present invention, it becomes possible to protect the card from being damaged when no phishing occurs.

Moreover, according to the present invention, the card detection mechanism is placed inside the protrusion that protrudes toward the ejecting direction of the card. Therefore, a position of the ejecting-direction end of the card can suitably be detected by the card detection mechanism. Namely, it can suitably be detected by the card detection mechanism whether or not the card is ejected to the pullout-enabled position. Therefore, according to the present invention, it becomes possible to suitably detect by the card detection mechanism if there exists a situation where phishing can come up. As a result, according to the present invention, it becomes possible to prevent phishing more suitably, and furthermore to protect the card more suitably from being damaged when no phishing occurs.

In the present invention, for example, the gate mechanism may have the protrusion in double formed in itself; and the card detection mechanism may detect the card having been ejected to the pullout-enabled position where the card can be pulled out at a concave portion formed between the two protrusions.

In the present invention, it is preferable that the card pullout prevention mechanism is located at a further card-ejecting-direction side in comparison with the card detection mechanism; and the card pullout prevention mechanism is a shutter mechanism including a shutter for opening and closing the insertion & ejection slot, and a shutter drive source for driving the shutter. Being structured in this way, the shutter colliding with the ejecting-direction end of the card protects the card from being pulled out. Therefore, even though the card is protected by the card pullout prevention mechanism from being pulled out, it becomes possible to keep a surface of the card from being damaged.

In the present invention, it is preferable that the shutter mechanism is located inside the protrusion. According to this structure, it becomes easier to prevent a criminal from breaking the shutter mechanism.

In the present invention, it is preferable that the shutter includes a blocking portion for blocking the insertion & ejection slot; the gate mechanism includes a shutter detection mechanism for detecting the blocking portion blocking the insertion & ejection slot; and the shutter detection mechanism directly detects part of the blocking portion. According to this structure, it becomes possible to detect for sure by using the shutter detection mechanism whether or not the blocking portion for blocking the insertion & ejection slot is broken by a criminal.

In the present invention, it is preferable that the shutter drive source regularly operates the shutter to carry out opening and closing operation of the insertion & ejection slot, under a situation where the card reader is not holding the card. According to this structure, under a situation where the card reader is not holding the card, it is possible to regularly check by using the shutter detection mechanism whether or not the blocking portion for blocking the insertion & ejection slot is broken. Accordingly, at the time when the card is inserted into the card reader, it is possible to detect for sure whether or not the blocking portion is broken.

In the present invention, it is preferable that, in the card reader, a card transfer path for transferring the card is formed internally; a second shutter member is placed at a further card-inserting-direction side in comparison with the gate mechanism; and the second shutter member is able to block an entire area of the card transfer path in a view from a transfer direction of the card. According to this structure, the shutter is placed inside the protrusion. Therefore, even when the shutter can block not all area of the insertion & ejection slot formed in the gate mechanism, blocking the card transfer path by the second shutter member makes it possible to protect various elements inside the card reader, and also to prevent dust from entering an inside of the card reader.

In the present invention, it is preferable that the protrusion is formed of an opaque material According to this structure, a criminal cannot visually identify the card detection mechanism and the shutter mechanism from an outside of the gate mechanism. Therefore, it becomes easier to prevent the criminal from breaking the card detection mechanism and the shutter mechanism.

In the present invention, it is preferable that a profile of the gate mechanism is formed almost like a semicircular column that swells toward the ejecting direction of the card. According to this structure, it becomes difficult for a criminal to install a means for phishing to the gate mechanism. Therefore, it becomes possible to effectively prevent phishing.

In the present invention, it is preferable that the gate mechanism includes a luminescent mechanism for illuminating a side surface of the concave portion. According to this structure, when the luminescent mechanism illuminates the side surface of the concave portion at the time of ejecting the card, the user can easily recognize where the card is ejected in the gate mechanism.

To bring a solution for the second subject described above, a card reader of the present invention includes: a magnetic head placed internally for at least one of reading magnetic data recorded in a card, and recording magnetic data into the card; and a gate mechanism having an insertion slot formed, for inserting the card, and being located at an end of a pullout direction of the card in the card reader; wherein a cutout portion being cut toward an inserting direction of the card is formed in the gate mechanism; the cutout portion is formed almost at the same location in a widthwise direction of the card as a location of the magnetic head, the widthwise direction of the card being almost perpendicular to the inserting direction of the card; and the gate mechanism includes a foreign object detection mechanism for detecting an object having been installed at the cutout portion, or in the vicinity of the cutout portion.

In the card reader of the present invention, a cutout portion being cut toward an inserting direction of the card is formed in the gate mechanism, and the cutout portion is formed almost at the same location in a widthwise direction of the card as a location of the magnetic head, the widthwise direction of the card being almost perpendicular to the inserting direction of the card. Therefore, a criminal is likely to install a magnetic head for skimming at the cutout portion. In the meantime, according to the present invention, the gate mechanism includes a foreign object detection mechanism for detecting an object having been installed at the cutout portion, or in the vicinity of the cutout portion. Therefore, if once a magnetic head for skimming is installed at the cutout portion where the magnetic head can easily be installed, the foreign object detection mechanism detects the magnetic head. Thus, according to the present invention, the installing location of the magnetic head for skimming is easily identified; and furthermore, if the magnetic head for skimming is installed at the identified location, the magnetic head is detected by the foreign object detection mechanism. Namely, according to the present invention, it becomes easier to detect the magnetic head for skimming having been installed to the gate mechanism. As a result, it becomes possible according to the present invention to effectively prevent skimming by means of taking a predetermined action, at the time when the magnetic head for skimming is installed at the cutout portion.

In the present invention, it is preferable that the cutout portion is a concave portion hollowed toward the inserting direction of the card; and two protrusions are so formed as to sandwich the concave portion in the gate mechanism, the two protrusions protruding toward the pullout direction of the card from an end of the concave portion in the inserting direction of the card. In this case, it is preferable that a profile of the gate mechanism is formed almost like a semicircular column that swells toward the pullout direction of the card. According to this structure, it becomes difficult for a criminal to install a magnetic head for skimming at any place other than the concave portion. Namely, according to this structure, it becomes further easier to identify an installing location of the magnetic head for skimming. Therefore, it becomes possible to detect for sure the magnetic head for skimming having been installed to the gate mechanism. As a result, it becomes possible to prevent skimming more effectively.

In the present invention, it is preferable that the foreign object detection mechanism is an optical detection mechanism including a light emitting device and a light receiving element that receives a light beam emitted from the light emitting device; and the light emitting device is placed inside one of the two protrusions, while the light receiving element is placed inside the other of the two protrusions. In other words, preferably the foreign object detection mechanism should be a so-called pass-through-type detection system. If the foreign object detection mechanism is a so-called reflection-type detection system, it becomes difficult to detect a magnetic head for skimming having been installed at the concave portion when the magnetic head for skimming is covered with a light-absorbing component, or any component for intercepting a light beam coming from the light emitting device toward the magnetic head for skimming is attached to the magnetic head for skimming. Nevertheless, according to this structure using a pass-through-type detection system, even when the magnetic head for skimming is covered with a light-absorbing component, or any component for intercepting a light beam coming from the light emitting device toward the magnetic head for skimming is attached to the magnetic head for skimming, it becomes possible to detect the magnetic head for skimming having been installed in the concave portion. Namely, a detection accuracy of the foreign object detection mechanism can be improved.

In the present invention, it is preferable that the protrusions are formed of an opaque material. According to this structure, a criminal cannot visually identify the foreign object detection mechanism from an outside of the gate mechanism. Therefore, it becomes easier to prevent the criminal from breaking the foreign object detection mechanism.

In the present invention, it is preferable that the gate mechanism includes a luminescent mechanism for illuminating a side surface of the concave portion. In the case where the concave portion is formed between the two protrusions, a pullout-direction end of the card at the time when a user pulls out the card is positioned inside the concave portion. Nevertheless, according to this structure, illuminating the side surface of the concave portion by the luminescent mechanism at the time of pulling out the card enables the user to easily recognize where the card is located in the gate mechanism.

In the present invention, for example, the gate mechanism may includes a shutter mechanism for blocking the insertion slot; and the shutter mechanism may block the insertion slot when the foreign object detection mechanism detects a foreign object. Accordingly in this case, it is possible to prevent skimming by way of preventing the user from inserting the card into the insertion slot.

As described above, the card reader of the present invention is able to prevent phishing by using a card pullout prevention mechanism installed as a constituent component of the card reader, and furthermore able to protect a card from being damaged when no phishing comes up.

Moreover, the card reader of the present invention is able to effectively prevent skimming by using a foreign object detection mechanism installed as a constituent component of the card reader.

BRIEF DESCRIPTION OF THE DRAWINGS

FIG. 9 includes drawings for explaining a structure of the luminescent mechanism shown in FIG. 7; wherein FIG. 9A is a side view.

shown in FIG. 9A.

DETAILED DESCRIPTION OF EMBODIMENTS

It is to be understood that the figures and descriptions of the present invention have been simplified to illustrate elements that are relevant for a clear understanding of the present invention, while eliminating, for purposes of clarity, many other elements which are conventional in this art. Those of ordinary skill in the art will recognize that other elements are desirable for implementing the present invention. However, because such elements are well known in the art, and because they do not facilitate a better understanding of the present invention, a discussion of such elements is not provided herein.

The present invention will now be described in detail on the basis of exemplary embodiments.

General Structure of Card Reader

Figure 1:
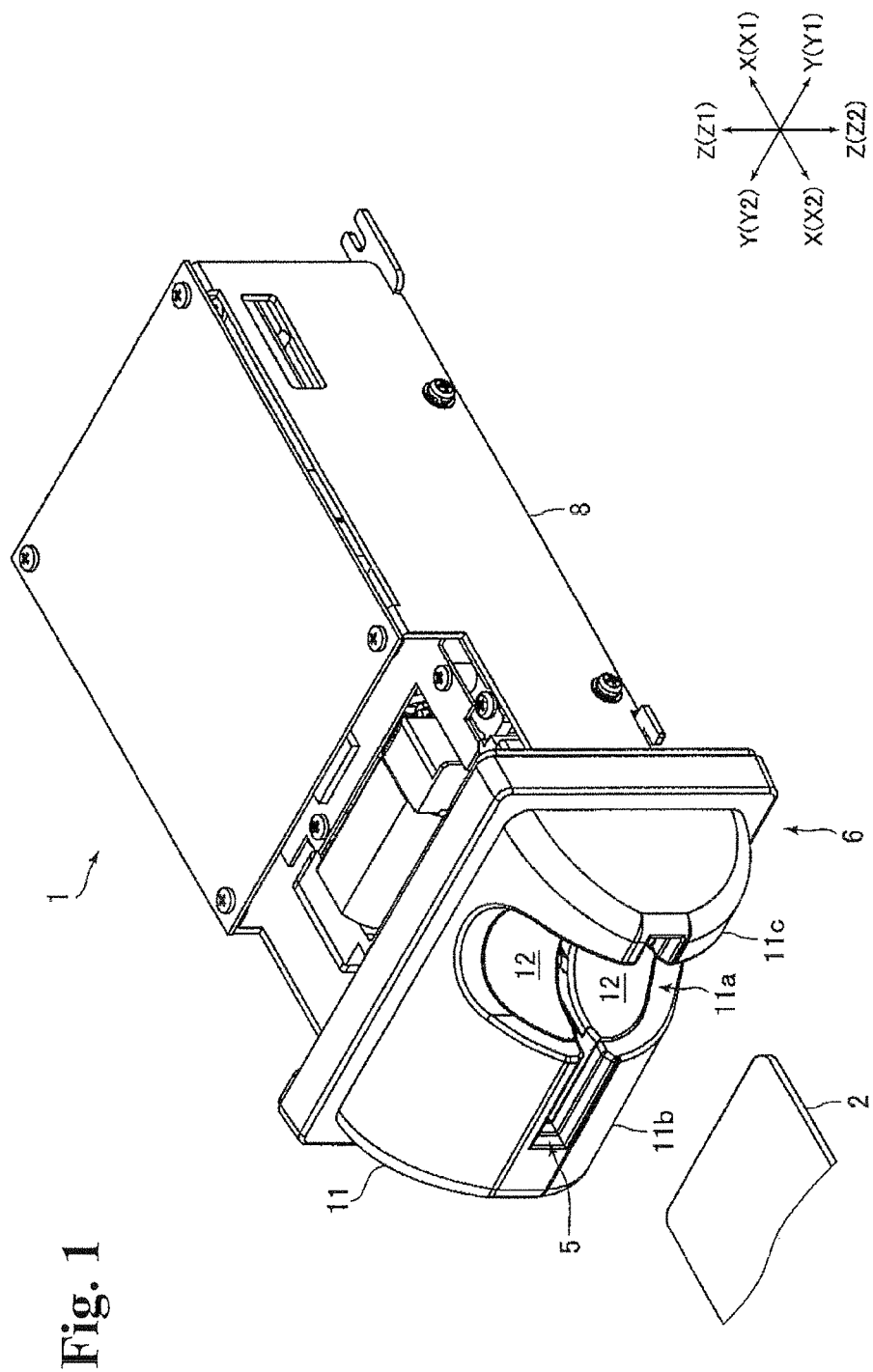
FIG. 1 is a perspective view of a card reader according to an embodiment of the present invention.
Figure 2:
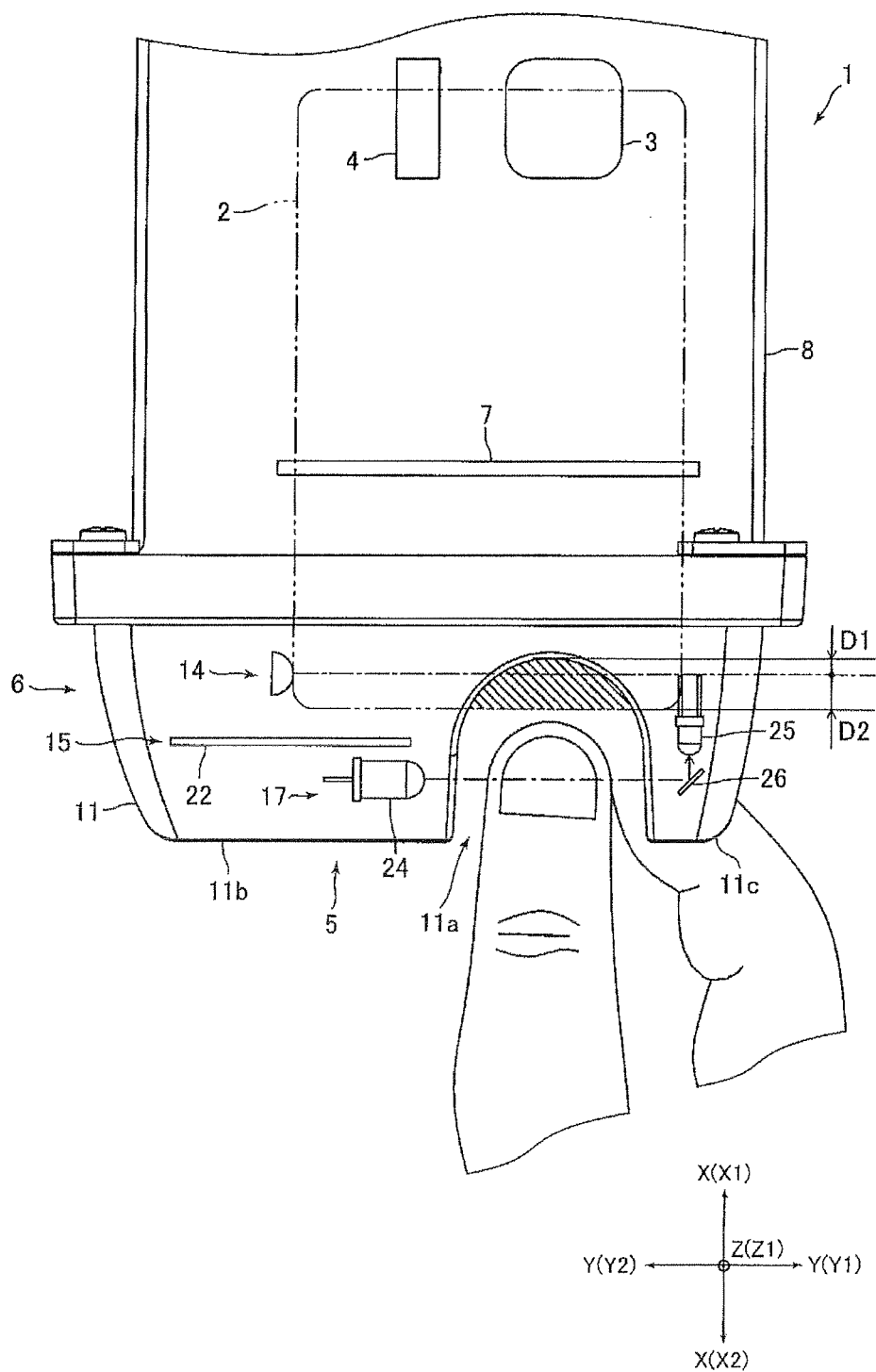
FIG. 2 is a plan view for explaining a general structure of the card reader shown in FIG. 1.

FIG. 1 is a perspective view of a card reader 1 according to an embodiment of the present invention. FIG. 2 is a plan view for explaining a general structure of the card reader 1 shown in FIG. 1.

The card reader 1 according to the present embodiment is a device for reading magnetic data recorded in a card 2 and/or recording magnetic data into the card 2. The card reader 1 is used, being installed, for example, in a higher-level device such as an Automate Teller Machine (ATM). Inside the card reader 1, a card transfer path through which the card 2 is transferred is formed. As shown in FIG. 1 and FIG. 2, the card reader 1 is furthermore equipped with a magnetic head 3 for reading magnetic data and/or recording magnetic data, a card transfer mechanism including a transfer roller 4 and the like for taking in and ejecting the card 2, a gate mechanism 6 including an insertion & ejection slot 5 through which the card 2 is inserted and ejected, and a shutter 7 as a second shutter member for closing the card transfer path.

In the present embodiment, the card 2 is transferred in an X-direction shown in FIG. 1 and so on. In other words, the X-direction is a transfer direction (passing direction) of the card 2. More in detail, the card 2 is inserted in an X1-direction, and ejected in an X2-direction. In other words, the X1-direction is an inserting direction of the card 2, and the X2-direction is an ejecting direction of the card 2. Then, a Z-direction almost perpendicular to the X-direction in FIG. 1 is a direction of a thickness of the card 2, and meanwhile a Y-direction almost perpendicular to the X-direction and the Z-direction in FIG. 1 is a direction of a width of the card 2 (widthwise direction). In the following explanation, an X1-direction side is a "rear (back)" side, an X2-direction side is a "front (near)" side, a Y1-direction side is a "right" side, a Y2-direction side is a "left" side, a Z1-direction side is an "upper" side, and a Z2-direction side is a "lower" side.

For example, the card 2 is a rectangular card made of polyvinyl chloride, having a thickness of about 0.7 to 0.8 mm. A magnetic strip, in which magnetic data is recorded, is formed in the card 2. In other words, the card 2 of the present embodiment is a magnetic card. Incidentally, in the card 2, an IC chip may be fixed, or an antenna for communication may be built in. Namely, the card 2 may be a contact IC card provided with a magnetic stripe, or may as well be a non-contact IC card provided with a magnetic stripe. Furthermore, the card 2 may be a polyethylene terephthalate (PET) card having a thickness of about 0.18 to 0.36 mm, or a paper card having a predetermined thickness, and the like.

The magnetic head 3 is placed inside a main body 8 of the card reader 1. The magnetic head 3 is located at a position where the magnetic head 3 can contact a magnetic stripe formed in the card 2. The card transfer mechanism is equipped with; a pad roller so placed as to face the transfer roller 4 and also as to be pressed against the transfer roller 4; a motor for driving the transfer roller 4; and a gear and the like for transmission of power of the motor, in addition to the transfer roller 4. The transfer roller 4 and the pad roller are located inside the main body 8. The gate mechanism 6 is fixed to a front-end surface of the main body 8, and located at a front end of the card reader 1. A detailed structure of the gate mechanism 6 is described later.

The shutter 7 is placed at a front-end side of the main body 8. A drive source such as a solenoid and the like is connected to the shutter 7. The shutter 7 of the present embodiment is constructed in such a way as to make it possible to block an entire area of the card transfer path in a view from a front-back direction.

Structure of Gate Mechanism

Figure 3:
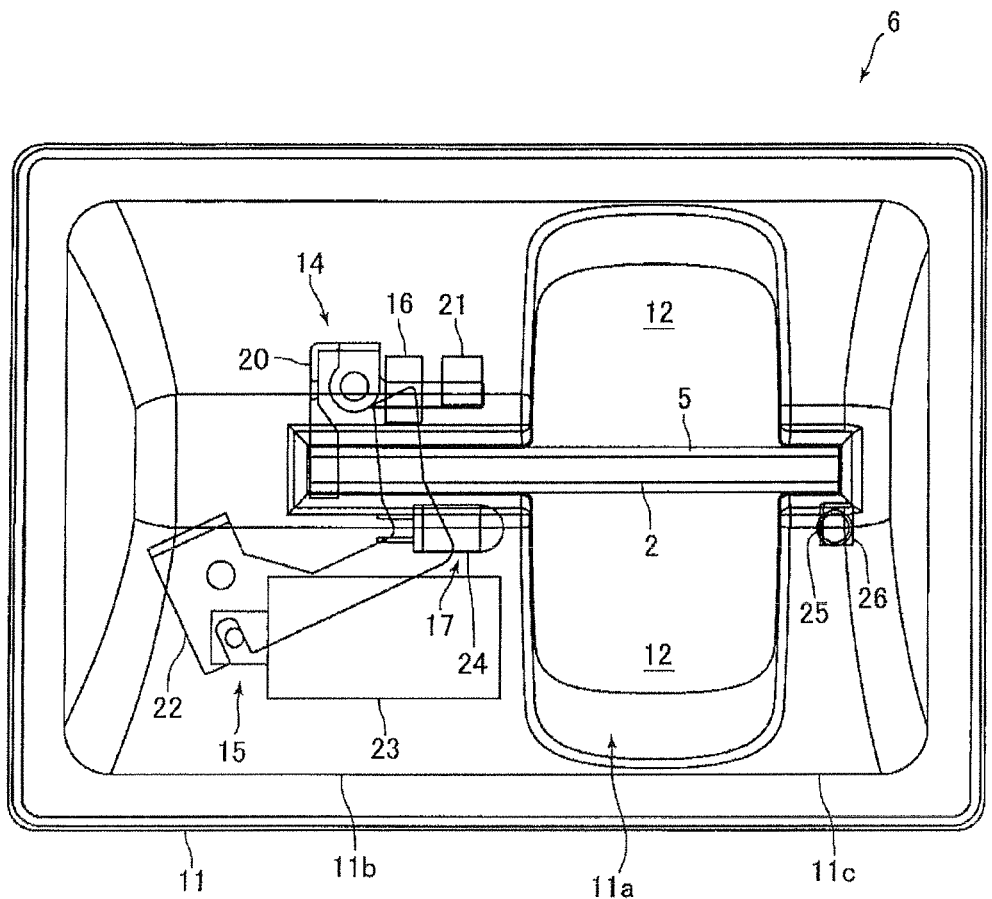
FIG. 3 is a front elevation view for explaining a structure of a gate mechanism shown in FIG. 1.
Figure 3:
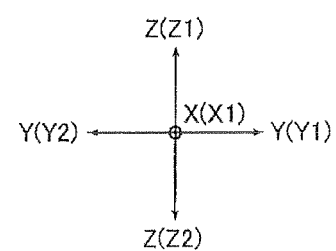
Figure 6:
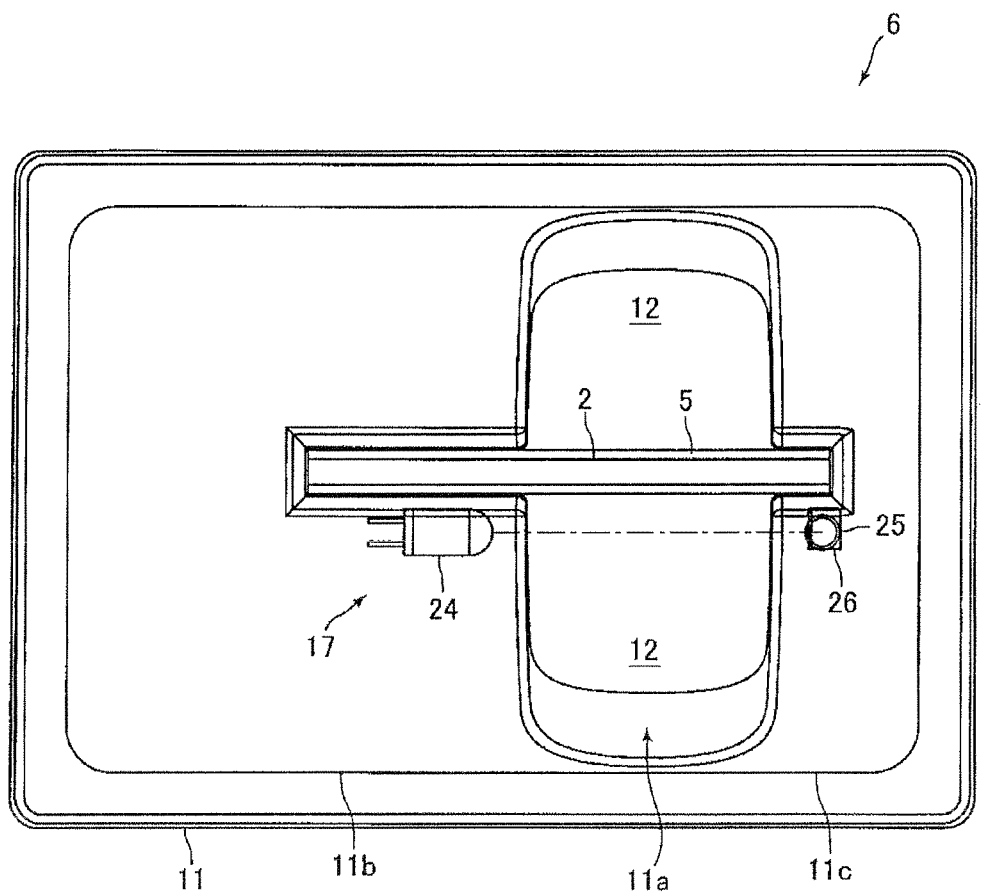
FIG. 6 is a front elevation view for explaining a structure of a foreign object detection mechanism shown in FIG. 3.
Figure 7:
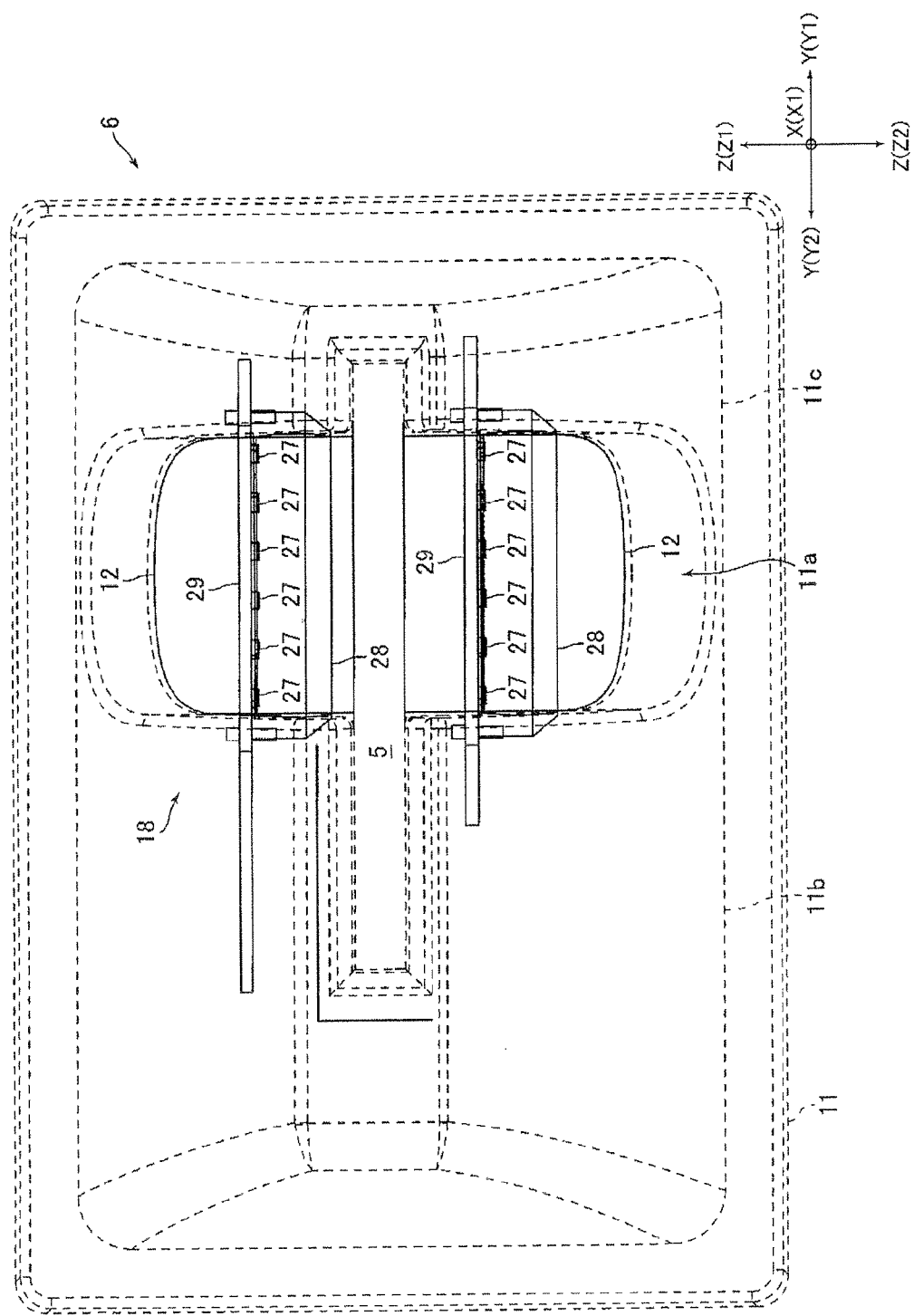
FIG. 7 is a front elevation view for explaining a structure of a luminescent mechanism for illuminating a side surface of a concave portion shown in FIG. 3.
Figure 8:
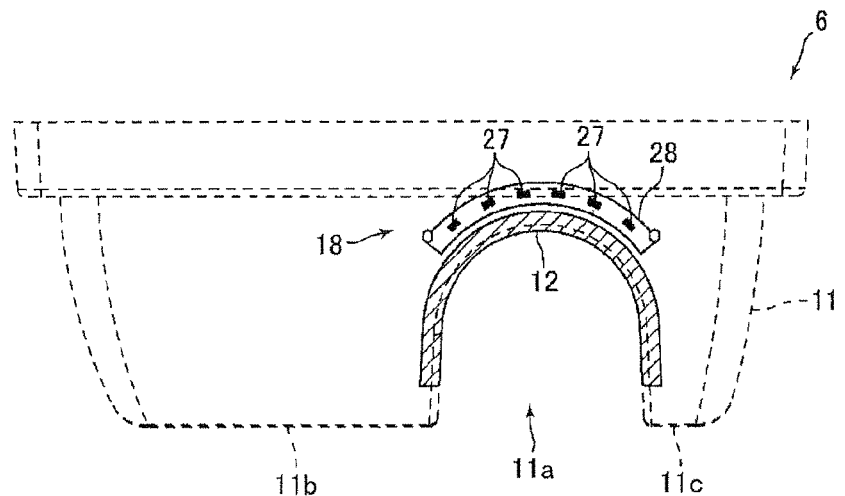
FIG. 8 is a plan view for explaining a structure of the luminescent mechanism shown in FIG. 7.
Figure 8:
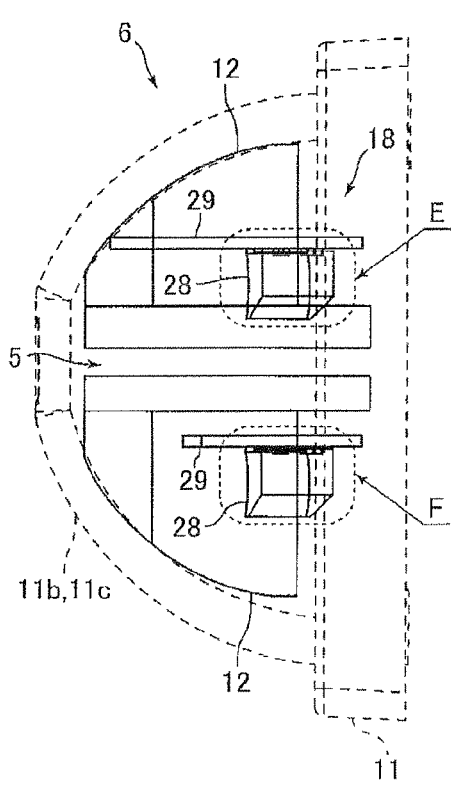
Figure 9B:
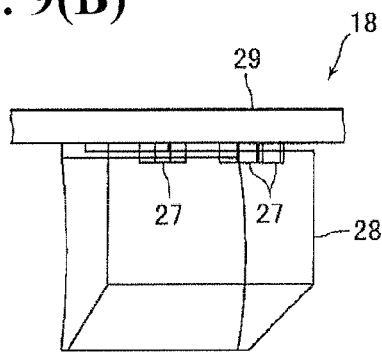
FIG. 9B is an enlarged view of a section "E"
Figure 9C:
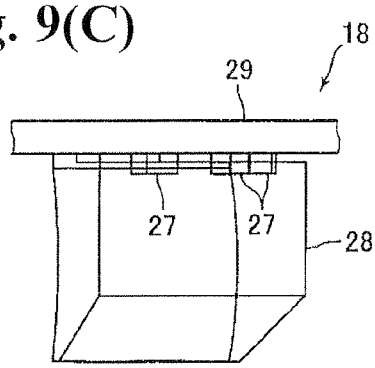
FIG. 9C is an enlarged view of a section "F" shown in FIG. 9A.

FIG. 3 is a front elevation view for explaining a structure of the gate mechanism 6 shown in FIG. 1. FIG. 4 is a front elevation view for explaining a structure and operation of a card detection mechanism 14 shown in FIG. 3. FIG. 5 is a front elevation view for explaining a structure and operation of a shutter mechanism 15 shown in FIG. 3. FIG. 6 is a front elevation view for explaining a structure of a foreign object detection mechanism 17 shown in FIG. 3. FIG. 7 is a front elevation view for explaining a structure of a luminescent mechanism 18 for illuminating a side surface of a concave portion 11a shown in FIG. 3. FIG. 8 is a plan view for explaining a structure of the luminescent mechanism 18 shown in FIG. 7. FIG. 9 includes drawings for explaining a structure of the luminescent mechanism 18 shown in FIG. 7; wherein FIG. 9A is a side view, FIG. 9B is an enlarged view of a section "E" shown in FIG. 9A, and FIG. 9C is an enlarged view of a section "F" shown in FIG. 9A.

As shown in FIG. 1, the gate mechanism 6 is so shaped as to be almost a semicircular column as a whole. In other words, a profile of the gate mechanism 6 is formed almost like a semicircular column that swells in a frontward direction. More specifically, a profile of a housing 11 of the gate mechanism 6 is formed almost like a semicircular column that swells in a frontward direction.

In the housing 11, formed is a cutout portion 11a materialized by cutting out a part in a backward direction. The cutout portion 11a of the present embodiment is a concave portion formed by hollowing backward an intermediate part of the housing 11 in a right-and-left direction. Therefore, the cutout portion 11a is hereinafter called a "concave portion 11a".

As described above, the concave portion 11a hollowed backward is formed in the housing 11. In other words, two protrusions 11b and 11c are formed in the housing 11, while having a space between them in the right-and-left direction, wherein the two protrusions 11b and 11c are protruding in a frontward direction from a rear end part of the concave portion 11a. Namely, the concave portion 11a is formed between the two protrusions 11b and 11c in such a way as to be sandwiched between the two protrusions 11b and 11c. Furthermore, in the housing 11, the insertion & ejection slot 5 is formed in such a way as to go through in the front-back direction.

As shown in FIG. 2, the concave portion 11a is so formed as to be almost U-shaped in a view from a vertical direction.

Concretely to describe, the concave portion 11a is so formed as to be almost U-shaped in the view from the vertical direction, in such a way that a front-end side of the portion has an opening. Moreover, a width of the concave portion 11a (a width in the right-and-left direction) is wide enough for a finger of a user of the card reader 1 to be placed. Furthermore, as shown in FIG. 2, the concave portion 11a is formed almost at the same location in the right-and-left direction as a location of the magnetic head 3. In other words, the concave portion 11a is formed almost at the same location in the right-and-left direction as a location of the magnetic stripe of the card 2 inserted into the card reader 1. Eventually in a view from the vertical direction, the magnetic stripe of the card 2 inserted into the card reader 1 passes through the concave portion 11a.

The protrusion 11b is formed at a left side of the concave portion 11a. In the meantime, the protrusion 11c is formed at a right side of the concave portion 11a. A width of the protrusion 11b in the right-and-left direction is wider than a width of the protrusion 11c in the right-and-left direction. Then, as described above, the concave portion 11a is formed almost at the same location in the right-and-left direction as the location of the magnetic head 3, and meanwhile the protrusions 11b and 11c are formed at locations different from the location of the magnetic head 3, in the right-and-left direction.

The housing 11 is formed of an opaque material. For example, the housing 11 is formed of an opaque resin material. Then, a section where the concave portion 11a of the housing 11 is formed is an opening. A semitransparent member 12 formed of a semitransparent material is fixed to the opening, and namely the opening is covered with the semitransparent member 12. In other words, a side surface of the concave portion 11a is constructed with the semitransparent member 12. The semitransparent member 12 is, for example, formed of a semitransparent resin material.

As shown in FIG. 2 and FIG. 3, the gate mechanism 6 includes: the card detection mechanism 14 for detecting a front-end side of the card 2 having been ejected to a predetermined position by the card transfer mechanism; the shutter mechanism 15 as a card pullout prevention mechanism for protecting the card 2 from being pulled out when the front-end side of the card 2 is not ejected to the predetermined position at the time of ejection of the card 2; a shutter detection mechanism 16 for detecting the status of the shutter mechanism 15; and the foreign object detection mechanism 17 for detecting a foreign object having been installed in the concave portion 11a. Furthermore, as shown in FIG. 7, the gate mechanism 6 also includes the luminescent mechanism 18 for illuminating a side surface of the concave portion 11a.

The card detection mechanism 14 includes a lever 20 that is able to contact the card 2, and a sensor 21 for detecting whether or not the lever 20 is contacting the card 2. The card detection mechanism 14 is placed inside the protrusion 11b. The sensor 21 is an optical sensor including a light emitting device and a light receiving element. The lever 20 includes a card contacting portion 20a for contacting a left edge of the card 2, and a light intercepting portion 20b for light interception between the light emitting device and the light receiving element of the sensor 21. The lever 20 is so formed as to be almost L-shaped in a view from the front-back direction. The lever 20 is rotatable around a predetermined rotation axis, and meanwhile the card contacting portion 20a is movable so as to enter the insertion & ejection slot 5 and evacuate from the same.

Figure 4A:
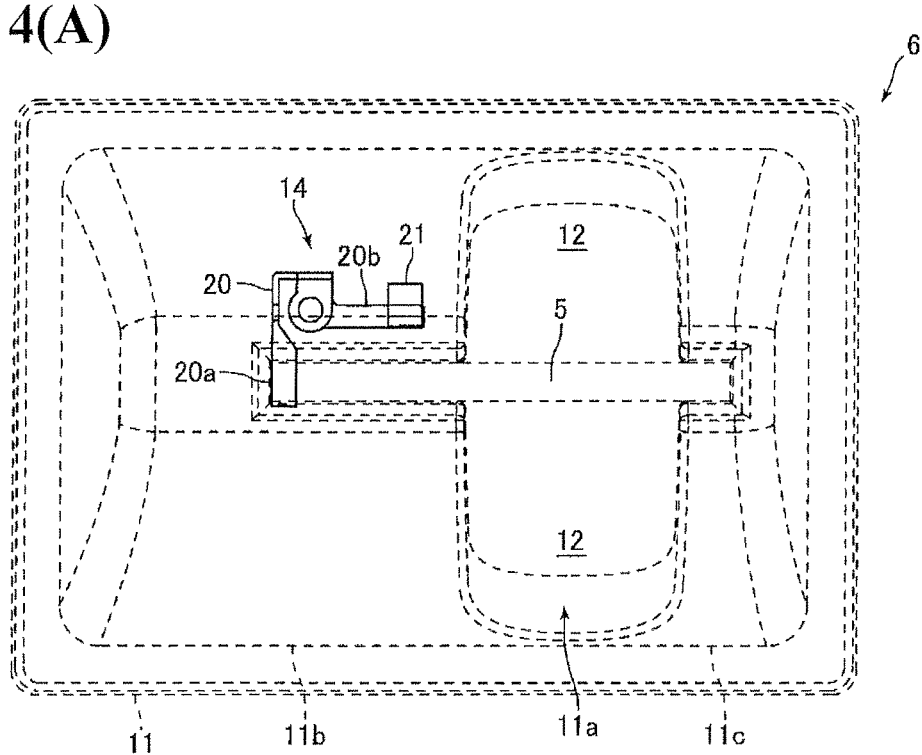
FIGS. 4(A) and 4(B) are front elevation views for explaining a structure and operation of a card detection mechanism shown in FIG. 3.
Figure 4B:
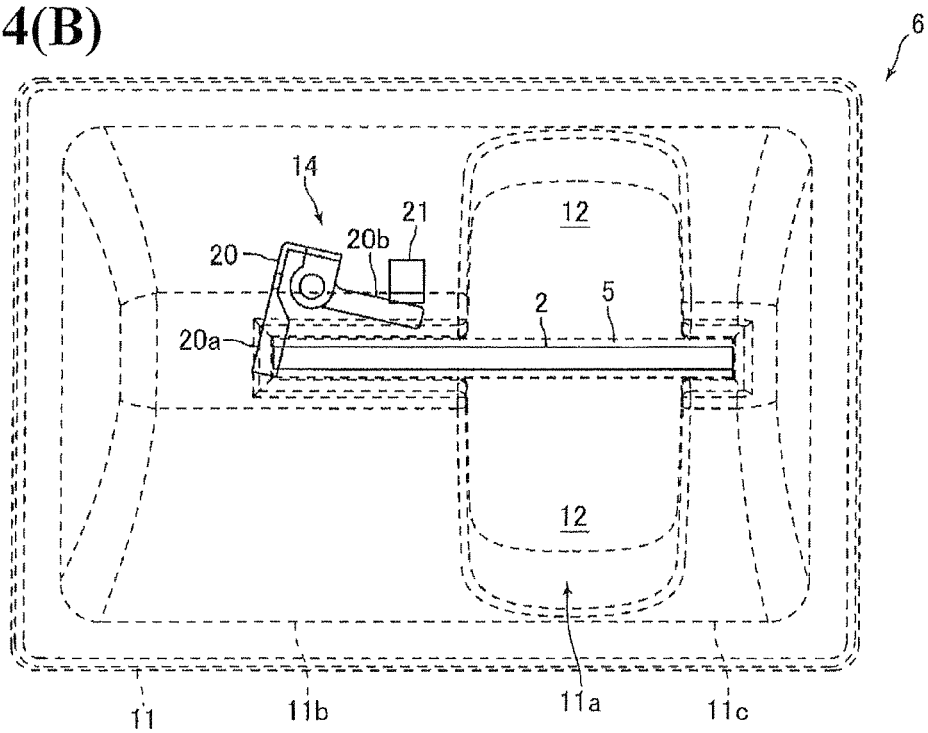

As shown in FIG. 4A, under a situation where the card 2 is not contacting the card contacting portion 20a, the card contacting portion 20a is positioned in the insertion & ejection slot 5, and the light intercepting portion 20b intercepts a space between the light emitting device and the light receiving element of the sensor 21. Meanwhile, under a situation where a left edge of the card 2 contacts the card contacting portion 20a, the lever 20 rotates in such a way that the card contacting portion 20a evacuates from the insertion & ejection slot 5 and the light intercepting portion 20b steps away from the space between the light emitting device and the light receiving element of the sensor 21, as shown in FIG. 4B. When the light intercepting portion 20b steps away from the space between the light emitting device and the light receiving element of the sensor 21, the card detection mechanism 14 detects the card 2.

The card detection mechanism 14 of the present embodiment detects the card 2 having been ejected by the card transfer mechanism at the time of ejecting the card 2 to a pullout-enabled position where the user of the card reader 1 can pull the card 2 out of the card reader 1 at the concave portion 11a, as shown in FIG. 2. Concretely to describe, the card detection mechanism 14 detects the card 2 having been ejected by the card transfer mechanism to the position where the user can pull the card 2 out of the card reader 1 at the concave portion 11a, as shown in FIG. 2. More specifically, the card detection mechanism 14 detects the front-end side of the card 2 having been ejected by the card transfer mechanism to a position where the user can pull the card 2 out of the card reader 1; at the time of pulling out the card, the user inserts the user's fingers such as the index finger and the thumb into the concave portion 11a to pinch the front-end side of the card 2 between the fingers inserted. For example, the card detection mechanism 14 detects a front end of the card 2 having been ejected for a distance D1 away from the rear end part of the concave portion 11a, as shown in FIG. 2.

Incidentally, according to the present embodiment, when ejecting operation of the card 2 by the card transfer mechanism finishes off, a rear-end side of the card 2 is pinched between the transfer roller 4 and the pad roller placed so as to face the transfer roller 4 (refer to FIG. 2). Furthermore, according to the present embodiment, when the card 2 is normally ejected by the card transfer mechanism, the card transfer mechanism further ejects the card 2 according to design specifications for a distance D2 after the card detection mechanism 14 detects the front end of the card 2, and then the card 2 stops. Incidentally, the card detection mechanism 14 of the present embodiment also serves as a function of detecting the card 2 having been inserted into the card reader 1.

The shutter mechanism 15 includes: a shutter 22 for opening and closing the insertion & ejection slot 5 that is located at a more frontward side in comparison with the card detection mechanism 14, and a solenoid 23 as a shutter drive source for driving the shutter 22. The shutter mechanism 15 is placed inside the protrusion 11b. The shutter 22 includes a blocking portion 22a for blocking the insertion & ejection slot 5. The blocking portion 22a is so shaped as to protrude upward, in order to partly block a left end side of the insertion & ejection slot 5. The shutter 22 is rotatable around a predetermined rotation axis, and meanwhile the blocking portion 22a is movable so as to enter the insertion & ejection slot 5 and evacuate from the same. Being located at a position lower than the insertion & ejection slot 5, the solenoid 23 is connected to the shutter 22.

Figure 5A:
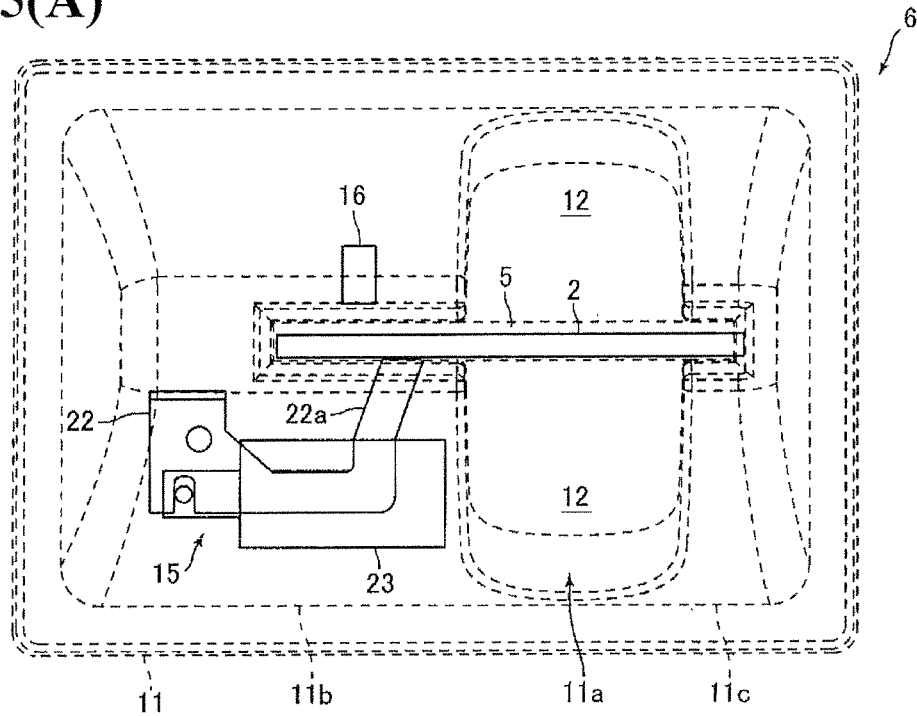
FIGS. 5(A) and 5(B) are front elevation views for explaining a structure and operation of a shutter mechanism shown in FIG. 3.
Figure 5B:
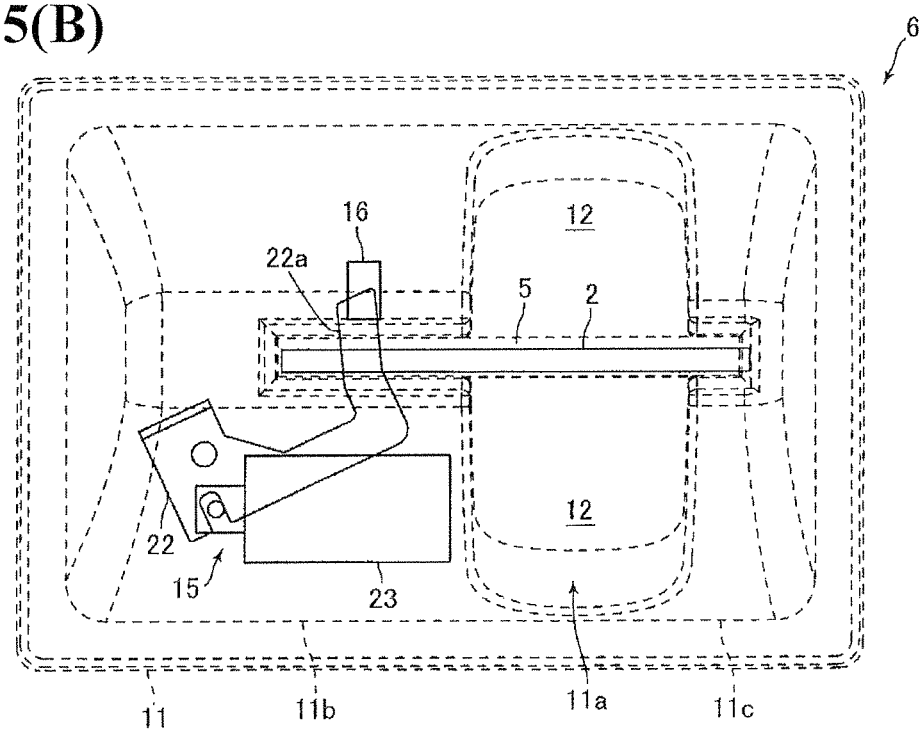

As shown in FIG. 5A, under a situation where the shutter 22 keeps open the insertion & ejection slot 5, a plunger of the solenoid 23 is in a protruding state and the blocking portion 22a is in a state of evacuating downward under the insertion & ejection slot 5. If the plunger of the solenoid 23 retracts under the situation, the shutter 22 rotates counterclockwise in FIG. 5 to move the blocking portion 22a upward for blocking the insertion & ejection slot 5, as shown in FIG. 5B.

In the present embodiment, when the card 2 inserted by the user is taken into the main body at the time of taking in the card 2, the shutter 22 blocks the insertion & ejection slot 5. In the meantime, when the card 2 is ejected to the pullout-enabled position at the time of ejecting the card 2, the shutter 22 opens the insertion & ejection slot 5 to make it possible to pull the card 2 out of the card reader 1. On the other hand, if the card 2 is not ejected to the pullout-enabled position at the time of ejecting the card 2, the shutter 22 keeps blocking the insertion & ejection slot 5 in an ongoing manner to protect the card 2 from being pulled out of the card reader 1.

The shutter detection mechanism 16 is an optical sensor including a light emitting device and a light receiving element. The shutter detection mechanism 16 is located inside the protrusion 11b. Incidentally, the shutter detection mechanism 16 is located at a position higher than the insertion & ejection slot 5. In the present embodiment, when the shutter 22 blocks the insertion & ejection slot 5, an upper end side of the blocking portion 22a intercepts a space between the light emitting device and the light receiving element of the shutter detection mechanism 16, as shown in FIG. 5B. In other words, the shutter detection mechanism 16 detects the blocking portion 22a blocking the insertion & ejection slot 5 in the present embodiment. Incidentally, the shutter detection mechanism 16 directly detects part of the upper end side of the blocking portion 22a that blocks the insertion & ejection slot 5.

The foreign object detection mechanism 17 is an optical detection mechanism including a light emitting device 24 and a light receiving element 25 that receives a light beam emitted from the light emitting device 24. Incidentally, the foreign object detection mechanism 17 is a pass-through-type detection system in which a foreign material is detected when a light beam passing through from the light emitting device 24 toward the light receiving element 25 is intercepted. The foreign object detection mechanism 17 is equipped with a mirror 26 for changing a direction of a light beam emitted from the light emitting device 24. The light emitting device 24 is, for example, a Light Emitting Device (LED); and meanwhile the light receiving element 25 is, for example, a photo transistor.

The light emitting device 24 is located inside the protrusion 11b. Incidentally, the light emitting device 24 is located at a more frontward side in comparison with the shutter 22. Then, the light emitting device 24 is so arranged as to emit a light beam in a rightward direction. Concretely to describe, the light emitting device 24 is so placed as to emit a light beam passing through the concave portion 11a.

The light receiving element 25 and the mirror 26 are located inside the protrusion 11c. The light receiving element 25 is placed in such a way that a light receiving surface of the light receiving element 25 faces frontward. Meanwhile, the mirror 26 is located ahead of the light receiving element 25 so as to change a direction of a light beam, which is emitted from the light emitting device 24 to travel toward the right, to a backward direction.

In the present embodiment, if a foreign object is installed in the concave portion 11a, the light beam moving from the light emitting device 24 toward the light receiving element 25 is intercepted by the foreign object. As a result, the foreign object detection mechanism 17 detects the foreign object having been installed. For example, when a criminal installs a magnetic head in the concave portion 11a in order to illegally acquire magnetic data of the card 2, namely for a skimming scam, the foreign object detection mechanism 17 detects the magnetic head for a skimming scam having been installed.

The luminescent mechanism 18 includes a plurality of light sources 27 and a prism 28 for diffusing light beams emitted from the light sources 27. The light sources 27 are, for example, LEDs and they are mounted on a substrate 29. As shown in FIG. 8, the plurality of light sources 27 are arranged almost in an arching line along a side surface at a rear-end side of the concave portion 11a. The plurality of light sources 27 and the substrate 29 are placed at both an upper side and a lower side of the insertion & ejection slot 5. The prism 28 is so formed as to be almost arching-shaped in a view from a vertical direction, as shown in FIG. 8, and the prism 28 is so placed as to cover the plurality of light sources 27.

In the present embodiment, light beams emitted from the light sources 27 are diffused by the prism 28, and then the light beams pass through the semitransparent member 12. Therefore, when the light sources 27 emit light, the side surface of the concave portion 11a becomes luminous.

Outline of Card Reader Operation

Explained below are an outline of operation for prevention of phishing as well as an outline of operation for prevention of skimming in the card reader 1 constructed as described above.

At first, an outline of operation of the card reader 1 for prevention of phishing is explained. If the card detection mechanism 14 does not detect the front-end side of the card 2 under a situation where the card 2 taken inside the card reader 1 is ejected by the card transfer mechanism, the shutter 22 having blocked the insertion & ejection slot 5 after taking in the card 2 keeps blocking the insertion & ejection slot 5 in an ongoing manner. In other words, if the card detection mechanism 14 does not detect the front-end side of the card 2 at the time of ejecting the card 2, it is judged that a means for phishing has been installed in the card reader 1. Then, the shutter 22 keeps blocking the insertion & ejection slot 5 in an ongoing manner in order to disable the criminal from pulling out the card 2.

Furthermore, if the card detection mechanism 14 does not detect the front-end side of the card 2 at the time of ejecting the card 2, the card reader 1 notifies a higher-level device that there exists an abnormal happening. When receiving the notification, the higher-level device notifies the user that there exists the abnormal happening by way of predetermined operation, such as indicating on a display of the higher-level device that there exists the abnormal happening, sounding a buzzer, and/or flashing the light sources 27.

Incidentally, when the card reader 1 is not holding the card 2, and no transaction with respect to the card 2 is carried out in the card reader 1, the solenoid 23 regularly operates the shutter 22 to carry out opening and closing operation of the insertion & ejection slot 5. If the shutter detection mechanism 16 does not detect the blocking portion 22a at the time of the opening and closing operation, it is judged that a criminal has broken the blocking portion 22a so that the blocking portion 22a cannot block the insertion & ejection slot 5 under the situation at the time. Then, the card reader 1 notifies the higher-level device that there exists an abnormal happening. When receiving the notification, the higher-level device aborts any subsequent operation of taking in the card 2. For example, the shutter 7 blocks the card transfer path, and/or operation of transferring the card 2 by the card transfer mechanism is disabled.

Next, an outline of operation of the card reader 1 for prevention of skimming is explained. When no transaction with respect to the card 2 is carried out, the light emitting device 24 keeps on emitting light for watching whether or not any magnetic head for skimming and the like is installed in the concave portion 11a. If the light coming from the light emitting device 24 toward the light receiving element 25 is intercepted during the watching operation, it is judged that a magnetic head for skimming and the like is installed in the concave portion 11a. Then, in order to prevent the user from inserting the card 2, the shutter 22 blocks the insertion & ejection slot 5, or the shutter 7 blocks the card transfer path. Furthermore, in this case, the card reader 1 notifies the higher-level device that there exists an abnormal happening.

If the light emitting device 24 is an LED, it is preferable that the light emitting device 24 operates in a pulsed-lighting mode with optional lighting intervals when no transaction with respect to the card 2 is carried out. In this case, it becomes possible to flow a greater current than a rated value in the light emitting device 24, and namely the amount of light to be emitted from the light emitting device 24 can be increased. Accordingly, it becomes possible to increase a signal-to-noise ratio (SNR) at the light receiving element 25.

In the case where the light emitting device 24, materialized with an LED, operates in a pulsed-lighting mode when no transaction with respect to the card 2 is carried out, it is preferable that a judgment is made on whether or not a foreign object is detected at the foreign object detection mechanism 17 on the basis of a difference between an output value of the light receiving element 25 with a light beam emitted from the light emitting device 24 and an output value of the light receiving element 25 with no light beam emitted from the light emitting device 24. For example; while the difference between an output value of the light receiving element 25 with a light beam emitted from the light emitting device 24 and an output value of the light receiving element 25 with no light beam emitted from the light emitting device 24 being compared with a predetermined threshold; preferably it should be judged that a foreign object is detected at the foreign object detection mechanism 17 if the difference between the output values is less than the threshold. In this case, an effect of external light entering the light receiving element 25 can be suppressed, and therefore it becomes possible to detect more suitably a magnetic head for skimming and the like having been installed in the concave portion 11a.

Primary Advantageous Effect of the Present Embodiment

As explained above, in the present embodiment, the gate mechanism 6 includes: the card detection mechanism 14 for detecting the card 2 having been ejected by the card transfer mechanism to the pullout-enabled position where the user of the card reader 1 can pull the card 2 out of the card reader 1; and the shutter mechanism 15 for protecting the card 2 from being pulled out in the case where the card 2 is not ejected to the pullout-enabled position at the time of ejecting the card 2. Therefore, it becomes possible in the present embodiment to prevent phishing by way of protecting the card 2 with the shutter 22 from being pulled out in the case where a means for phishing is installed in the card reader 1 and the card 2 is not ejected to the pullout-enabled position so that the user cannot pull out the card 2.

In the present embodiment, the card 2 is protected, by the shutter 22 located at a more frontward side in comparison with the card detection mechanism 14, from being pulled out. Therefore, in the case of an attempt to pull out the card 2, the front end of the card 2 collides with the shutter 22. Accordingly, in the present embodiment, even though the card 2 is protected by the shutter mechanism 15 from being pulled out, a surface of the card 2 is free from being damaged.

In the present embodiment, even if a means for phishing is installed in the card reader 1, the shutter mechanism 15 does not interfere with a pullout of the card as far as the card 2 is ejected to the pullout-enabled position so that the use can pull out the card 2. In other words, even if the means for phishing is installed in the card reader 1, the shutter mechanism 15 does not interfere with a pullout of the card 2 under a situation where no phishing occurs. Therefore, in the present embodiment, there is no chance that the shutter mechanism 15 damages the card 2 under a situation where no phishing occurs.

In the present embodiment, the card detection mechanism 14 is placed inside the protrusion 11b that protrudes in a frontward direction. Therefore, a position of the front end of the card 2 can suitably be detected by the card detection mechanism 14. Namely, it can suitably be detected by the card detection mechanism 14 whether or not the card 2 is ejected to the pullout-enabled position. Accordingly, in the present embodiment, it becomes possible to suitably detect by the card detection mechanism 14 if there exists a situation where phishing can come up.

In the present embodiment, the card detection mechanism 14 and the shutter mechanism 15 are placed inside the protrusion 11b of the housing 11. Therefore, in the present embodiment, it becomes easy to prevent a criminal from breaking the card detection mechanism 14 and the shutter mechanism 15. Especially, in the present embodiment, the housing 11 is formed of an opaque material so that the criminal cannot visually identify the card detection mechanism 14 and the shutter mechanism 15 from an outside of the gate mechanism 6. Therefore, in the present embodiment, it becomes easier to prevent the criminal from breaking the card detection mechanism 14 and the shutter mechanism 15.

In the present embodiment, the shutter detection mechanism 16 directly detects part of the blocking portion 22a that blocks the insertion & ejection slot 5. Especially, in the present embodiment, the shutter detection mechanism 16 directly detects part of the upper end side of the blocking portion 22a that blocks the insertion & ejection slot 5 by way of moving upward. Therefore, it becomes possible to detect for sure by using the shutter detection mechanism 16 whether or not the blocking portion 22a for blocking the insertion & ejection slot 5 is broken by a criminal.

In the present embodiment, under a situation where the card reader 1 is not holding the card 2, the solenoid 23 regularly operates the shutter 22 to carry out opening and closing operation of the insertion & ejection slot 5. Therefore, under a situation where the card reader 1 is not holding the card 2, it is possible to regularly check by using the shutter detection mechanism 16 whether or not the blocking portion 22a for blocking the insertion & ejection slot 5 is broken. Accordingly, at the time when the card 2 is inserted into the card reader 1, it is possible to detect for sure whether or not the blocking portion 22a is broken. As a result, in the present embodiment as described above; when the blocking portion 22a is broken, prevention of phishing can be materialized by aborting any subsequent operation of taking in the card 2.

In the present embodiment, the shutter 7 being able to block an entire area of the card transfer path in a view from a front-back direction is located at a more backward side in comparison with the gate mechanism 6. Therefore, even when the blocking portion 22a blocks part of a left-end side of the insertion & ejection slot 5 while the shutter 22 being placed in the protrusion 11b, blocking the card transfer path by the shutter 7 makes it possible to protect various elements inside the card reader 1 such as the magnetic head 3 and so on, and also to prevent dust from entering an inside of the card reader 1. Furthermore, even after the shutter 22 is broken, it becomes possible by using the shutter 7 to prevent the card 2 from being inserted into the card reader 1.

In the present embodiment, a profile of the housing 11 is formed almost like a semicircular column that swells in a frontward direction. Therefore, it becomes difficult for a criminal to install a means for phishing to the gate mechanism 6. Accordingly, in the present embodiment, it becomes possible to effectively prevent phishing.

In the present embodiment, when the light sources 27 emit light, the side surface of the concave portion 11a becomes luminous. Therefore, for example, when the side surface of the concave portion 11a is made to flash at the time of ejecting the card 2, the user can easily recognize where the card 2 is ejected even though a front end part of the card 2 ejected stops at the concave portion 11a.

Moreover, in the present embodiment, being hollowed in a backward direction, the concave portion 11a is formed between the two protrusions 11b and 11c of the housing 11. The concave portion 11a is formed almost at the same location in the right-and-left direction as the location of the magnetic head 3. Furthermore, in the present embodiment, a profile of the housing 11 is formed almost like a semicircular column that swells in a frontward direction. Therefore, it is difficult for a criminal to install a magnetic head for skimming at any place other than the concave portion 11a. Namely, in the present embodiment, even though a magnetic head for skimming is installed in the gate mechanism 6, it becomes easy to identify the installing location.

Furthermore, in the present embodiment, the gate mechanism 6 is equipped with the foreign object detection mechanism 17 for detecting a foreign object having been installed in the concave portion 11a. Therefore, if once a magnetic head for skimming is installed in the concave portion 11a where the magnetic head can easily be installed, the foreign object detection mechanism 17 detects the magnetic head. Thus, in the present embodiment, the installing location of the magnetic head for skimming is easily identified; and furthermore, if the magnetic head for skimming is installed at the identified location, the magnetic head is detected by the foreign object detection mechanism 17. Therefore, it becomes possible to detect for sure the magnetic head for skimming having been installed to the gate mechanism 6. As a result, it becomes possible in the present embodiment to effectively prevent skimming by means of taking a predetermined action such as blocking the insertion slot 5 by the shutter 22 and the like, at the time when the magnetic head for skimming is installed to the gate mechanism 6.

In the present embodiment, the foreign object detection mechanism 17 is a pass-through-type detection system, and the light emitting device 24 is placed inside the protrusion 11b, while the light receiving element 25 is placed inside the protrusion 11c. Therefore, even when the magnetic head for skimming is covered with a light-absorbing component, or any component for intercepting a light beam coming from the light emitting device 24 toward the magnetic head for skimming is attached to the magnetic head for skimming, it becomes possible to detect the magnetic head for skimming having been installed in the concave portion 11a. Accordingly, in the present embodiment, a detection accuracy of the foreign object detection mechanism 17 can be improved.

In the present embodiment, the light emitting device 24 of the foreign object detection mechanism 17 is placed inside the protrusion 11b, and in the meantime the light receiving element 25 is placed inside the protrusion 11c. Therefore, it becomes easy to prevent a criminal from breaking the foreign object detection mechanism 17. Especially, in the present embodiment, the housing 11 is formed of an opaque material so that the criminal cannot visually identify the foreign object detection mechanism 17 from an outside of the gate mechanism 6. Therefore, in the present embodiment, it becomes easier to prevent the criminal from breaking the foreign object detection mechanism 17.

In the present embodiment, when the light sources 27 emit light, the side surface of the concave portion 11a becomes luminous. Therefore, for example, when the side surface of the concave portion 11a is made to flash at the time of ejecting the card 2, the user can easily recognize where the card 2 is ejected even though a front end part of the card 2 ejected stops at the concave portion 11a.

OTHER EMBODIMENTS

An embodiment and its modifications described above are an example of a preferred embodiment according to the present invention. Nevertheless, the present invention is not limited to the above embodiment and modifications, and various variations may be made without changing the concept of the present invention.

In the embodiment described above, the card pullout prevention mechanism for protecting the card 2 from being pulled out, when the card 2 at the time of ejection is not ejected to the pullout-enabled position, is the shutter mechanism 15 equipped with the shutter 22 located at a more frontward side in comparison with the card detection mechanism 14. Alternatively, the card pullout prevention mechanism may be structured, for example, in such a way as to protect the card 2 from being pulled out by way of holding the rear-end side of the card 2 in the main body 8. For example, the card pullout prevention mechanism may be structured in the same way as the anti-pullout locking mechanism described in JP 2006-155567 mentioned above. Moreover, the card pullout prevention mechanism may be structured, for example, with a pin to stick into the card 2 together with a drive source such as a solenoid and the like to drive the pin. Even when a means for phishing is installed in the card reader 1, the card pullout prevention mechanism does not protect the card 2 from being pulled out, as far as the card 2 is ejected to the pullout-enabled position so that the user can pull out the card 2. Therefore, in that case, even if the means for phishing is installed in the card reader 1, the card 2 can be kept away from being damaged, as far as no phishing occurs.

In the embodiment described above, the concave portion 11a is formed almost at the same location in the right-and-left direction as the location of the magnetic head 3. Alternatively, for example, the location of the concave portion 11a and the location of the magnetic head 3 may be displaced from each other in the right-and-left direction. Furthermore, although the concave portion 11a is so formed as to be almost U-shaped in a view from the vertical direction in the embodiment described above, the concave portion 11a may be so formed as to be polygonal such as an almost rectangular shape in the view from the vertical direction.

In the embodiment described above, protruding in the frontward direction from the rear end part of the concave portion 11a, the two protrusions 11b and 11c are formed in the housing 11. Alternatively, for example, one protrusion may be formed in the housing 11. In other words, the housing 11 may be so formed as to be almost L-shaped or almost T-shaped in a view from the vertical direction. For example, in the housing 11, the protrusion 11b may be formed while the protrusion 11c may not be formed. Moreover, three or more protrusions may be formed in the housing 11.

In the embodiment described above, the profile of the housing 11 is formed almost like a semicircular column that swells in the frontward direction. Alternatively, for example, the profile of the housing 11 may be formed almost like a rectangular parallelepiped.

In the embodiment described above, the shutter detection mechanism 16 detects the blocking portion 22a blocking the insertion & ejection slot 5, by means of detecting a part of the blocking portion 22a. Alternatively, for example, the shutter detection mechanism 16 may indirectly detect the blocking portion 22a blocking the insertion & ejection slot 5, by means of detecting any predetermined part of the shutter 22 other than the blocking portion 22a. Furthermore, the shutter detection mechanism 16 may indirectly detect the blocking portion 22a blocking the insertion & ejection slot 5, by means of detecting the plunger of the solenoid 23 or a predetermined member connected to the plunger.

In the embodiment described above, the sensor 21 is an optical sensor including a light emitting device and a light receiving element. Alternatively, the sensor 21 may be, for example, a mechanical sensor including a contact point and a contact lever that contacts the contact point. Furthermore, the card detection mechanism 14 may be a mechanical detection mechanism including a contact lever that directly contacts an edge of the card 2 in its widthwise direction, or an optical detection mechanism in which an arrangement is made in such a way that an edge of the card 2 in its widthwise direction directly intercepts a space between a light emitting device and a light receiving element.

Although the card 2 in the embodiment described above is a magnetic card including a magnetic stripe, the card 2 may not be a magnetic card. Moreover, although the gate mechanism 6 is equipped with the foreign object detection mechanism 17 and the luminescent mechanism 18 in the present embodiment, the gate mechanism 6 may not be equipped with any of the foreign object detection mechanism 17 and the luminescent mechanism 18.

In the embodiment described above, the foreign object detection mechanism 17 is a pass-through-type detection system equipped with the light emitting device 24 and the light receiving element 25. Alternatively, the foreign object detection mechanism 17 may be, for example, a reflection-type detection system equipped with a light emitting device and a light receiving element. In that case, the light emitting device and the light receiving element constituting the foreign object detection mechanism 17 are, for example, placed inside the protrusion 11b. Moreover, alternatively the foreign object detection mechanism 17 may be a mechanical detection system equipped with: a contact lever that can contact a foreign object installed in the concave portion 11a; and a contact point that turns on and off in accordance with operation of the contact lever. Furthermore, the foreign object detection mechanism 17 may be a mechanical detection system equipped with a contact point that can contact a foreign object installed in the concave portion 11a. Still further, the foreign object detection mechanism 17 may be an ultrasonic sensor.

In the embodiment described above, the cutout portion 11a is a concave portion formed so as to be hollowed in a backward direction; and protruding in the frontward direction from the rear end part of the concave portion 11a, the two protrusions 11b and 11c are formed in the housing 11. Alternatively, for example, one protrusion may be formed in the housing 11. In other words, the housing 11 may be so formed as to be almost L-shaped or almost T-shaped in a view from the vertical direction. For example, in the housing 11, the protrusion 11b may be formed while the protrusion 11c may not be formed. In that case, a portion of the housing 11, where no protrusion is formed, becomes a cutout portion. At least a part of the cutout portion is formed almost at the same location in the right-and-left direction as the location of the magnetic head 3. Incidentally, three or more protrusions may be formed in the housing 11.

In the embodiment described above, the profile of the housing 11 is formed almost like a semicircular column that swells in the frontward direction. Alternatively, for example, the profile of the housing 11 may be formed almost like a rectangular parallelepiped.

Although the concave portion 11a is so formed as to be almost U-shaped in a view from the vertical direction in the embodiment described above, the concave portion 11a may be so formed as to be polygonal such as an almost rectangular shape in the view from the vertical direction. Furthermore, although the gate mechanism 6 is equipped with the card detection mechanism 14, the shutter mechanism 15, and the luminescent mechanism 18 in the embodiment described above, the gate mechanism 6 may not be equipped with any of the card detection mechanism 14, the shutter mechanism 15, and the luminescent mechanism 18.

Although, in the embodiment described above, the card reader 1 is a card reader of a card transfer type equipped with a card transfer mechanism, a card reader to which a configuration of the present invention is applied may be a card reader of a hand operation type, in which reading out and so on with respect to magnetic data recorded in the card 2 is carried out while a user is manually transferring the card 2. For example, the card reader to which a configuration of the present invention is applied may be a so-called dip-type card reader, in which magnetic data is read out or recorded at the time of inserting a card into the card reader, or pulling the card out of the card reader.

While this invention has been described in conjunction with the specific embodiments outlined above, it is evident that many alternatives, modifications, and variations will be apparent to those skilled in the art. Accordingly, the preferred embodiments of the invention as set forth above are intended to be illustrative, not limiting. Various changes may be made without departing from the spirit and scope of the inventions as defined in the following claims.

REFERENCE NUMERALS 1. card reader
2. card
3. magnetic head
4. transfer roller (part of card transfer mechanism)
5. insertion & ejection slot
6. gate mechanism
7. shutter (second shutter member)
11a. concave portion
11b and 11c. protrusions
14. card detection mechanism
15. shutter mechanism (card pullout prevention mechanism)
16. shutter detection mechanism
17. foreign object detection mechanism
18. luminescent mechanism
22. shutter
22a. blocking portion
23. solenoid (shutter drive source)
24. light emitting device
25. light receiving element
X. card transfer direction
X1. card inserting direction
X2. card ejecting direction
Y. card width direction

What is claimed is:

1. A card reader comprising:
   a card transfer mechanism configured to take in and eject a card; and
   a gate mechanism having an insertion and ejection slot formed, for inserting and ejecting the card, and being located at an end of an ejecting direction of the card in the card reader;
   wherein a protrusion protruding toward the ejecting direction of the card is formed in the gate mechanism;
   wherein the gate mechanism includes:
      a card detection mechanism configured to detect the card having been ejected by the card transfer mechanism to a pullout-enabled position where a user of the card reader can pull out the card; and
      a card pullout prevention mechanism configured to protect the card from being pulled out when the card is not ejected to the pullout-enabled position at the time, of ejecting the card;
   wherein the card detection mechanism is placed inside the protrusion;
   wherein the gate mechanism has the protrusion in double formed in itself; and
   wherein the card detection mechanism detects the card having been ejected to the pullout-enabled position where the card can be pulled out at a concave portion formed between the two protrusions.

2. The card reader according to claim 1;
   wherein the card pullout prevention mechanism is located at a further card-ejecting-direction side in comparison with the card detection mechanism; and
   wherein the card pullout prevention mechanism is a shutter mechanism including a shutter for opening and closing the insertion and ejection slot, and a shutter drive source for driving the shutter.

3. The card reader according to claim 2;
   wherein the shutter mechanism is located inside the protrusion.

4. The card reader according to any one of claim 1;
   wherein the protrusion is formed of an opaque material.

5. The card reader according to claim 1;
   wherein a profile of the gate mechanism is formed as a semicircular column that swells toward the ejecting direction of the card.

6. The card reader according to claim 1;
   wherein the gate mechanism includes a luminescent mechanism for illuminating a side surface of the concave portion.

7. A card reader comprising:
   a card transfer mechanism configured to take in and eject a card; and
   a gate mechanism having an insertion and ejection slot formed, for inserting and ejecting the card, and being located at an end of an ejecting direction of the card in the card reader;
   wherein a protrusion protruding toward the ejecting direction of the card is formed in the gate mechanism;
   wherein the gate mechanism includes:
      a card detection mechanism configured to detect the card having been ejected by the card transfer mechanism to a pullout-enabled position where a user of the card reader can pull out the card; and
      a card pullout prevention mechanism configured to protect the card from being pulled out when the card is not ejected to the pullout-enabled position at the time of ejecting the card;
   wherein the card detection mechanism is placed inside the protrusion;
   wherein the card pullout prevention mechanism is located at a further card-ejecting-direction side in comparison with the card detection mechanism;
   wherein the card pullout prevention mechanism is a shutter mechanism including a shutter for opening and closing the insertion and ejection slot, and a shutter drive source for driving the shutter;
   wherein the shutter includes a blocking portion for blocking the insertion and ejection slot;
   wherein the gate mechanism includes a shutter detection mechanism for detecting the blocking portion blocking the insertion and ejection slot; and
   wherein the shutter detection mechanism directly detects part of the blocking portion.

8. The card reader according to claim 7;
   wherein the shutter drive source regularly operates the shutter to carry out opening and closing operation of the insertion and ejection slot, under a situation where the card reader is not holding the card.

9. A card reader comprising:
   a card transfer mechanism configured to take in and eject a card; and
   a gate mechanism having an insertion and ejection slot formed, for inserting and ejecting the card, and being located at an end of an ejecting direction of the card in the card reader;
   wherein a protrusion protruding toward the ejecting direction of the card is formed in the gate mechanism;
   wherein the gate mechanism includes:
      a card detection mechanism configured to detect the card having been ejected by the card transfer mechanism to a pullout-enabled position where a user of the card reader can pull out the card; and
      a card pullout prevention mechanism configured to protect the card from being pulled out when the card is not ejected to the pullout-enabled position at the time of ejecting the card;
   wherein the card detection mechanism is placed inside the protrusion;
   wherein the card pullout prevention mechanism is located at a further card-ejecting-direction side in comparison with the card detection mechanism;
   wherein the card pullout prevention mechanism is a shutter mechanism including a shutter for opening and closing the insertion and ejection slot, and a shutter drive source for driving the shutter;
   wherein the shutter mechanism is located inside the protrusion;
   wherein a card transfer path for transferring the card is formed internally;
   wherein a second shutter member is placed at a further card-inserting-direction side in comparison with the gate mechanism; and
   wherein the second shutter member is able to block an entire area of the card transfer path in a view from a transfer direction of the card.

10. A card reader comprising:
    a magnetic head placed internally configured to perform at least one of reading magnetic data recorded in a card, and recording magnetic data into the card; and
    a gate mechanism having an insertion slot formed, for inserting the card, and being located at an end of a pullout direction of the card in the card reader;

wherein a cutout portion being cut toward an inserting direction of the card is formed in the gate mechanism;

wherein the cutout portion is formed almost at the same location in a widthwise direction of the card as a location of the magnetic head, the widthwise direction of the card being almost perpendicular to the inserting direction of the card;

wherein the gate mechanism includes a foreign object detection mechanism configured to detect an object having been installed at the cutout portion, or in the vicinity of the cutout portion;

wherein the cutout portion is a concave portion hollowed toward the inserting direction of the card; and wherein two protrusions are so formed as to sandwich the concave portion in the gate mechanism, the two protrusions protruding toward the pullout direction of the card from an end of the concave portion in the inserting direction of the card.

11. The card reader according to claim 10;

wherein a profile of the gate mechanism is formed as a semicircular column that swells toward the pullout direction of the card.

12. The card reader according to claim 10;

wherein the foreign object detection mechanism is an optical detection mechanism including a light emitting device and a light receiving element that receives a light beam emitted from the light emitting device; and wherein the light emitting device is placed inside one of the two protrusions, while the light receiving element is placed inside the other of the two protrusions.

13. The card reader according to claim 12;

wherein the protrusions are formed of an opaque material.

14. The card reader according to claim 10;

wherein the gate mechanism includes a luminescent mechanism for illuminating a side surface of the concave portion.

15. The card reader according to claim 10;

wherein the gate mechanism includes a shutter mechanism configured to block the insertion slot; and wherein the shutter mechanism blocks the insertion slot when the foreign object detection mechanism detects a foreign object.

* * * * *